Patented July 31, 1934

1,968,466

UNITED STATES PATENT OFFICE 1,968,466

METHOD OF PRODUCING STABLE NITROCELLULOSE

John L. Parsons, Erie, Pa., assignor to Hammermill Paper Company, Erie, Pa., a corporation of Pennsylvania No Drawing. Application November 29, 1930, Serial No. 499,132

7 Claims. (Cl. 260—146)

This invention has to do with the production of stable nitrocellulose which is capable of use in a wide variety of ways, as in the manufacture of lacquers, moving picture films, explosives, and many similar products.

In the production of nitrocellulose or cellulose nitrate a suitable raw cellulosic material is ordinarily dipped in a solution or mixture containing sulphuric acid, nitric acid and water. A typical nitrating mixture may contain, for example, 60.5% sulphuric acid, 22.9% nitric acid, and 16.6% water. After the cellulosic material, in the form of either loose fibers or sheets, composed, for example, of purified absorbent cotton, cotton linters, chemical wood pulps and the like, taken singly or in mixtures, has been properly nitrated by remaining in contact with the acid mixture for a sufficient time at an appropriate temperature, the product may be washed, bleached and given various other purification treatments. For example it may be given an acid boil followed by an alkaline treatment and then beaten, washed again, blended and dehydrated. These purification steps are primarily for the purpose of removing traces of acids and small quantities of undesirable substances formed by the action of the acids during the nitrating operation. If these impurities are not removed from the nitrocellulose as completely as possible, without taking drastic purification steps, decomposition of the product will set in at an early stage. In the course of time any nitrocellulose product will undergo certain changes resulting in rendering films formed of the material brittle, for example, and discoloring lacquers containing certain coloring materials as well as causing peeling of a coating applied to textiles, metals or the like. The more completely the product is stabilized by the removal of the objectionable impurities, the longer will be its life and the more slowly will it undergo decomposition.

In order to bring about a more stable product, it has been a common practice to add various substances, known as stabilizers, anti-acids, activators, or accelerators, to the colloided nitrocellulose to increase its stability. Examples of such stabilizers are urea and diphenylamine which have the effect of removing traces of nitric oxides as they are produced in the course of the decomposition of the nitrocellulose. If these oxides were permitted to accumulate there would be set up a condition of autocatalytic reaction which would greatly accelerate the decomposition of the material. While the addition of suitable stabilizers to the nitrated cellulose is fairly effective as a means of retarding the decomposition of the final product, it is not completely satisfactory and is comparatively expensive and difficult to properly regulate.

It has been a primary object of the present invention to provide a simple and more effective method of producing nitrocellulose of relatively high stability. Toward this end the invention contemplates the addition of certain compounds to the cellulosic material prior to nitration of the same with the result that a highly stable nitrated product will be formed.

It has been discovered that by subjecting purified cellulosic material such as absorbent cotton, cotton linters, chemical wood pulp and the like, or mixtures of these materials, to treatment by a chemical compound of certain metals such as salts or oxides of chromium, nickel, iron and the like, prior to the nitration step, a remarkable and surprising degree of stability is brought about in the nitrated product. The employment of an oxidizing agent including a metal of the type specified, as for example chromium trioxide, has been found to be particularly effective for the intended purpose.

In a specific example of a use of the process of the present invention five hundred grams of purified absorbent cotton may be suspended in three-and-one-half litres of a ninety percent acetic acid solution containing twenty grams of chromium trioxide, having an oxidizing equivalent of approximately 0.10 atomic portions of oxygen per molecule of $C_6H_{10}O_5$. After the material has been left in suspension in such a solution until the oxidant is consumed, which will normally take between twenty-four hours and three days, depending upon various conditions, at a temperature of about 22° C. to 26° C., it may be washed with water until it is free from acid and subsequently it may be dried. The material is then ready for nitration in the usual way by treatment with a suitable mixture of sulphuric and nitric acids and water.

The nitrocellulose produced in this way, after having been properly washed and purified by the customary treatments, possesses exceptional keeping qualities. Decomposition which would set in to substantially deteriorate untreated cellulose in a period of a few years is eliminated or retarded to such an extent that the life of the product is very materially increased. The nature of the reactions which take place as the result of the pre-treatment of the cellulosic material in the manner specified is not fully recognized. In so far as the reactions are understood during the pretreatment of the cellulose, there appears to be an absorption of the metal, such as chromium in the particular example cited, in the form of some compound which prolongs the period of decomposition by inhibiting the formation of nitric oxides and similar destructive substances. Oxidation of the cellulose prior to nitration along with its absorption of the metal in the course of the pre-treatment also appears to contribute to the stabilization effect.

While a chromium compound and more particularly an oxide of chromium, has been found to be especially effective for the purposes of this process, other related metals, such as iron, nickel, vanadium, cobalt and the like, may be employed particularly in the form of some oxidizing compound. Iron and nickel oxides, for example, singly or in combination may suitably be used or a different chromium compound, such as potassium bichromate or the like may be employed either in conjunction with or in lieu of chromium trioxide. The metals which are considered to be most suitably employed in the form of appropriate compounds are those which are relatively heavy, having atomic weights falling between 50 and 60 and being found in the fourth series of Mendeleeff's periodic grouping.

According to the present invention, therefore, cellulosic materials of the type specified may be converted into nitrocellulose having relatively great stability by a pre-treatment of the material prior to nitration. Various compounds, preferably oxidizing agents or compounds in an oxidizing solution, bearing certain metals may be employed in the pre-treatment and these compounds may advantageously be evenly distributed through the cellulose by the use of a solution of a weak acid or similar carrier. While certain specific substances and compounds have been mentioned, it will be understood that the invention is not limited to the use of these particular substances and that they may be replaced in full or in part by other equivalent materials. The conditions of temperature, time, acidity or alkalinity, concentration of solution, relative quantities of the various ingredients employed, and the like, are also subject to wide variation without departing from the general spirit and scope of the present invention. Thus while the metal compound employed in the pre-treatment of the cellulose is preferably carried by a weak acid solution it may be placed in a slightly alkaline solution; it is considered best, however, not to employ a solution which is either strongly acid or strongly alkaline. The solution should be of comparatively low hydrogen or hydroxyl ion concentration and may advantageously be substantially neutral.

What I claim is:

1. A process for the production of a stabilized nitrocellulose which comprises first subjecting the cellulosic raw material to a treatment with a chemical compound of a metal, in a non-reducing state, having an atomic weight between 50 and 60 in a weak acid solution for a sufficient period of time and at a suitable temperature to impregnate the material with a compound of such metal, and then nitrating the product.

2. A process for the production of a stabilized nitrocellulose which comprises first subjecting the cellulosic raw material to the action of chromium trioxide ($CrO_3$) dissolved in an aqueous solution of acetic acid, and then nitrating the product.

3. A process for the production of a stabilized nitrocellulose which comprises first subjecting a cellulosic raw material to the action of an oxide of a metal having an atomic weight between 50 and 60 dissolved in an aqueous solution of a weak acid for a sufficient period of time and at a suitable temperature to impregnate the material with a compound of such metal, and then nitrating the product.

4. A process for the production of a stabilized nitrocellulose which comprises first subjecting the cellulosic raw material to a treatment with a weak acid solution containing one or more chemical compounds of metals having atomic weights between 50 and 60 for a sufficient period of time and at a suitable temperature to impregnate the material with compounds of such metals which will inhibit the formation of substances destructive to nitrocellulose and then nitrating the product.

5. A process for the production of a stabilized nitrocellulose which comprises first subjecting the cellulosic raw material to a treatment with a solution of an "ic" compound of chromium for a sufficient period of time and at a suitable temperature to impregnate the material with a chromium compound and then nitrating the product.

6. A process for the production of a stabilized nitrocellulose which comprises first subjecting the cellulosic raw material to a treatment with a slightly acid solution of one or more "ic" compounds of metals of the group having atomic weights between 50 and 55 for a sufficient period of time and at a suitable temperature to impregnate the material with compounds of such metals which will inhibit the formation of substances destructive to nitrocellulose, and then nitrating the product.

7. A process for the production of a stabilized nitrocellulose which comprises first subjecting the cellulosic raw material to a treatment with an "ic" compound of a metal of the group consisting of vanadium and chromium in a substantially neutral solution for a sufficient period of time and at a suitable temperature to impregnate the material with a compound of such a metal, and then nitrating the product.

JOHN L. PARSONS.